(12) United States Patent
Adolfsson et al.

(10) Patent No.: US 12,428,272 B2
(45) Date of Patent: Sep. 30, 2025

(54) SYSTEM FOR LIFTING AND MOVING HEAVY OBJECTS

(71) Applicant: Norled AS, Stavanger (NO)

(72) Inventors: Karolina Adolfsson, Stavanger (NO); Erik Godøy, Nesbru (NO); Otto Koch, Vedavågen (NO); Ragnar Langåker, Stol (NO); Svein Johnny Naley, Kvalavåg (NO); Eirik Undheim, Undheim (NO)

(73) Assignee: Norled AS, Stavanger (NO)

( * ) Notice: Subject to any disclaimer, the term of this patent is extended or adjusted under 35 U.S.C. 154(b) by 0 days.

(21) Appl. No.: 18/576,955

(22) PCT Filed: Jun. 23, 2022

(86) PCT No.: PCT/NO2022/050148
§ 371 (c)(1),
(2) Date: Jan. 5, 2024

(87) PCT Pub. No.: WO2023/282759
PCT Pub. Date: Jan. 12, 2023

(65) Prior Publication Data
US 2024/0375915 A1     Nov. 14, 2024

(30) Foreign Application Priority Data

Jul. 8, 2021 (NO) .................................. 20210885

(51) Int. Cl.
*B66C 19/00* (2006.01)
*B63B 27/10* (2006.01)
(Continued)

(52) U.S. Cl.
CPC .............. *B66C 19/00* (2013.01); *B63B 27/10* (2013.01); *B66C 11/00* (2013.01); *B66C 23/52* (2013.01); *B66C 23/68* (2013.01); *B66C 23/701* (2013.01)

(58) Field of Classification Search
CPC ....... B66C 19/00; B66C 23/701; B66C 23/52; B66C 23/68; B66C 23/04; B66C 11/00;
(Continued)

(56) References Cited

U.S. PATENT DOCUMENTS

| | | | | |
|---|---|---|---|---|
| 1,545,346 A | * | 7/1925 | Morin ..................... | G01G 19/14 212/75 |
| 2,456,104 A | * | 12/1948 | Andersen ................ | B63B 27/12 414/141.5 |

(Continued)

FOREIGN PATENT DOCUMENTS

| | | |
|---|---|---|
| FR | 505146 A | 7/1920 |
| FR | 2313256 A1 | 12/1976 |

(Continued)

OTHER PUBLICATIONS

Norwegian Application No. 20210885, Search Report dated Feb. 3, 2022, 2 pages.
(Continued)

*Primary Examiner* — Gregory W Adams
(74) *Attorney, Agent, or Firm* — Andrus Intellectual Property Law, LLP

(57) ABSTRACT

A transport system is for transporting an object back and forth between a storage area and a target area. The transport system has a pedestal for being placed at one of the storage area and the target area. The transport system has a main boom pivotably connected to the pedestal. The main boom has a far end configured for being supported by the other one of the storage area and the target area while allowing for at
(Continued)

least one rotational degree of freedom between the main boom and the other one of the storage area and the target area. The main boom has a span that is passively adjustable in length. Furthermore, the transport system has a transport boom coupled with the main boom, and an object handler guided by the transport boom and configured for handling the object to be transported between the storage area and the target area.

20 Claims, 13 Drawing Sheets

(51) Int. Cl.
*B66C 11/00* (2006.01)
*B66C 23/52* (2006.01)
*B66C 23/68* (2006.01)
*B66C 23/70* (2006.01)

(58) Field of Classification Search
CPC ..... B66C 23/44; B66C 7/00; B66C 2700/012; B66C 19/002; B60L 53/80; B60L 2200/32; B63B 27/10; B63H 21/17; Y02T 10/70
USPC ............ 414/141.5, 542, 139.6, 142.8, 745.6, 414/137.5, 139.4; 212/307, 74, 314
See application file for complete search history.

(56) References Cited

U.S. PATENT DOCUMENTS

| | | | | |
|---|---|---|---|---|
| 2,541,893 A | * | 2/1951 | Speer | B63B 27/10 |
| | | | | 114/375 |
| 3,083,838 A | * | 4/1963 | Bevard | B66C 17/00 |
| | | | | 414/142.8 |
| 4,021,019 A | * | 5/1977 | Sanders | B63B 27/10 |
| | | | | 254/281 |
| 4,632,622 A | * | 12/1986 | Robinson | B63B 27/18 |
| | | | | 414/139.6 |
| 5,718,555 A | * | 2/1998 | Swalheim | B60P 1/60 |
| | | | | 414/505 |
| 7,686,175 B2 | * | 3/2010 | Waisanen | B65D 88/121 |
| | | | | 212/315 |
| 9,643,690 B2 | | 5/2017 | Hessels | |
| 9,688,490 B2 | * | 6/2017 | Maij | B65G 67/62 |
| 10,392,083 B2 | * | 8/2019 | Van Aalst | B63B 27/30 |
| 10,640,335 B2 | * | 5/2020 | Donahue | B66C 13/00 |
| 11,174,135 B1 | * | 11/2021 | Bjorback | B66C 23/48 |
| 2011/0170988 A1 | * | 7/2011 | Perry | B66C 13/02 |
| | | | | 414/803 |
| 2019/0062129 A1 | * | 2/2019 | Schroeder | B66C 23/708 |
| 2020/0013652 A1 | * | 1/2020 | Kobayashi | B66C 19/00 |
| 2021/0238947 A1 | * | 8/2021 | Tiberio | E21B 33/06 |
| 2021/0245846 A1 | * | 8/2021 | Prins | B63B 27/30 |
| 2021/0291940 A1 | * | 9/2021 | Englebert | B63B 27/34 |

FOREIGN PATENT DOCUMENTS

| | | | |
|---|---|---|---|
| WO | WO-9008093 A1 * | 7/1990 | ............ B66C 23/52 |
| WO | 2017103139 A1 | 6/2017 | |
| WO | 2018084716 A1 | 5/2018 | |
| WO | 2020009570 A1 | 1/2020 | |
| WO | 2020190147 A1 | 9/2020 | |

OTHER PUBLICATIONS

PCT/NO2022/050148, International Search Report and Written Opinion dated Sep. 6, 2023 pages.
PCT/NO2022/050148, International Preliminary Report on Patentability dated Aug. 18, 2023, 5 pages.

* cited by examiner

SYSTEM FOR LIFTING AND MOVING HEAVY OBJECTS

CROSS-REFERENCE TO RELATED APPLICATIONS

This application is the U.S. national stage application of International Application No. PCT/NO2022/050148, filed Jun. 23, 2022, which international application was published on Jan. 12, 2023 as WO 2023/282759 in the English language. The International Application claims priority to Norwegian patent application Ser. No. 20/210,885, filed Jul. 8, 2021. The international application and Norwegian application are both incorporated herein by reference, in their entirety.

FIELD

The invention relates to a transport system for lifting and handling objects, more particularly the invention relates to a transport system for loading and unloading battery packs on and off a maritime vessel.

BACKGROUND

In recent years, there has been an increased effort to make marine vessel switch from fuel driven motors to electric propulsion system to reduce the $CO_2$ footprint of the maritime industry.

Maritime vessels, such as boats, ships, and ferries, powered by batteries, will normally have permanently installed batteries, which are charged when the vessel is at dock. Some ferries and most lightweight high-speed vessels used for shuttling passengers and vehicles spend only a few minutes at the quay, which is not sufficient time for charging the high-capacity batteries required for these types of maritime vessels.

One type of shuttle-service vessel is typically operating continuously for several hours in the morning and in the afternoon, while staying at the quay in the meantime. The fixed battery installation needed for several hours continuous operation would require large battery packs, leading to a large added weight on board. As lightweight high-speed vessels are weight sensitive, it is undesirable to load them with too much weight, as it causes energy consumption to increase.

Other high-speed vessels are operating in long-haul routes along the coast or in a fjord. This trip can typically be several hours long, with intermediate stops along the route. There are normally no charging possibilities on the intermediate stops, meaning that the charging will need to take place only at the end stops and diesel will normally be required as a range-extender. A full-electric trip of this length would require a very large, permanently installed battery pack. The weight and size of this battery pack would become the dimensioning factor for the vessel, forcing an increase in the vessel size and cost. Furthermore, the required charging power at the end stops will become very high, sometimes leading to high grid reinforcement costs.

An alternative to large, permanently installed battery packs, could be to use smaller battery packs, which could be swapped and charged at the quays, be it at end-stops or at intermediate stops, thus minimising added weight. This would make it possible for light-weight high-speed vessels to operate continuously for up to a full day by swapping battery packs at for example each or every second stop. In addition, using smaller battery packs which could be swapped, would enable normal sized vessels to perform a zero-emission long-haul journey on pure battery operation. Battery swap is also ideal for retrofitting existing diesel vessels, as these are normally not designed for carrying the weight of a large battery bank. Moreover, several vessels trafficking the same the quays can share a common battery pool, reducing the total battery capacity needed and benefitting from a sharing economy.

Hence it is necessary to find a solution for swapping used batteries with charged batteries while the vessel is docked at the quay. Such a battery swap should ideally be done fully automated and during the short time the vessel is docked.

WO 2018/084716 A1 describes a transport system for swapping rechargeable batteries between a battery room in a floating vessel and a charging station located outside the vessel, such that the vessel can be positioned close to the charging station. The transport system is based on a lifting table for moving the battery packs, a tower support with a movable arm configured to lift the battery packs using winch devices, or a conveyor belt for transporting the battery packs. The systems described in WO 2018/084716 A1 give complex operations which are difficult to do by automation. In addition, ship movements, particularly with small vessels, may cause delays in these battery transport operations.

WO 2020/190147 A1 describes a system for autonomous battery exchange system for a marine vessel, wherein self-driving battery assemblies drives between charging station on shore and docking station on vessel. The self-driving battery assemblies are configured for autonomous movement between the docking station and the charging station. For driving back and forth between the docking station and the charging station, the self-driving battery assemblies uses the loading ramp of the marine vessel at the quay, which could potentially interfere and interrupt the passage for vehicles or passengers and thus delaying the departure of the vessel.

WO 90/08093 describes a transport system for on- and off-loading containers from a floating vessel. The transport system comprises a boom that can span across the vessel, a crab that can move along the boom, and hoisting means for containers suspended from the crab. The boom is supported by two supporting structures, one on shore and one on a floating base on the seaside of the vessel. The floating part of the crane can be detached from the land mounted part.

Small marine vessels, such as the ones used in shuttle-services for passengers and vehicles, are more exposed to movements in the water while at the quay, compared to large container ships. The transport system described in WO 90/08093 is designed for large container ship and would not adequately compensate for the rolling and pitching of a small vessel. Ship movements, particularly with small ships, would cause delays while transporting the batteries back and forth. This crane system is therefore not so suitable for loading and unloading to and from a small marine vessel.

In view of the above-described problems there is a further need to develop a transport system for loading and unloading objects, such as battery packs, to and from a floating vessel.

SUMMARY

The invention has for its object to provide a stable transport system of battery packs, but also other objects, to and from a vessel wherein vessel movements are compensated for.

The object is achieved through features which are specified in the description below and in the claims that follow.

The invention is defined by the independent patent claim. The dependent claims define advantageous embodiments of the invention.

In a first aspect the invention relates to a transport system for transporting an object back and forth between a storage area and a target area, wherein the transport system comprises:
- a pedestal for being placed at one of the storage area and the target area,
- a main boom pivotably connected to the pedestal, wherein the main boom has a far end that is configured for being supported by the other one of the storage area and the target area while allowing for at least one rotational degree of freedom between the main boom and the other one of the storage area and the target area, wherein a span of the main boom is passively adjustable in length, at least during a first operational mode of the transport system, wherein the main boom is either telescopic or foldable,
- a transport boom being coupled with the main boom, the transport boom extending in a horizontal direction from the storage area to the target area, in operational use, and
- an object handler movable along or moved by the transport boom and being configured for handling the object to be transported between the storage area and the target area.

The effects of the features of the transport system in accordance with the invention are as follows. First of all, the support of the main boom on both sides gives a stable mechanical link between the two areas while transferring an object with the object handler along the transport boom. Secondly, the transport system tolerates vessel movements through two features as follows. The first feature is the dynamically adjustable length of the span of the main boom, which allows the main boom to compensate for vessel movements at least in the first operational mode of the transport system. Alternatively, one section of the main boom may be locked while another section is passively adjustable. The passive adjustment of the length of the span of the main boom is also referred to as a free-float mode in the description. The transport system might also have a further operational mode wherein the length of the span of the main boom is actively controlled by actuators. In order to allow vessel movements, such as a heave, pitch and roll to be compensated, it is required to have a pivotably connection between the main boom and the pedestal, but also the system needs the at least one rotational degree of freedom between the far end of the main boom and its support on the area on the opposite side of the pedestal. It is in particular these two features in combination that fully enable the vessel to roll, pitch, heave and move freely while docked at the quay. The adjustable length of the span of the main boom can compensate for vessel movement as a result of rolling, heaving and moving of the vessel. The far end of the boom supported on the vessel needs to have at least one rotational degree of freedom to compensate for pitch movements. It is important for the transport system to allow for vessel movements while the boom is mechanically linked at both the storage area and the target area. If not, the forces from the vessel movements could damage and break parts of the system. Furthermore, the adjustable length of the span of the main boom constitutes a safe way to compensate for (or one could say "tolerate") vessel movements. The main boom is not required to be slidably connected to the pedestal to compensate for vessel movements having the hazardous risk of sticking out on the backside of the pedestal. This also means that during transport of the objects, the main boom does not move back and forth behind the pedestal. People and vehicles may therefore move freely behind the pedestal during transport of the objects.

In order to facilitate understanding of the invention one or more expressions are further defined hereinafter.

Throughout the description and claims the wording "span of the main boom" is to be interpreted as the reach between end points of the main boom.

Throughout the description and claims the word "object" must be interpreted as any type of cargo that can be transported between two areas. The objects can be battery packs, hydrogen tanks, other modules, boxes, containers, or cargo.

Throughout the description and claims the wording "object handler" must be interpreted as any type of gripping device for gripping and lifting an object. Alternative words for object handler are docking head, Remote Operated Vehicle (ROV), docking hook, docking bar, docking claw, docking mushroom, vacuum suction cup, vacuum head, docking mechanism, cargo actuator, movable trolley, a load actuator, a robot gripper, a robot arm, an automated hook, a magnetic head, and a latch mechanism.

Throughout the description and claims the wording "storage area" must be interpreted as any area where objects can be placed. The storage area can be an area on shore, on a floating platform, on a floating vessel or on a quay.

Throughout the description and claims the wording "target area" must be interpreted as any area where objects can be placed. The storage area can be an area on shore, on a floating platform, on a floating vessel or on a quay.

Throughout the description and claims the word "pedestal" must be interpreted as any structure than can support a boom. Alternative words for pedestal are crane support, robot-arm support, beam support and boom support.

Throughout the description and claims the word "boom" must be interpreted as a structure that comprises an arm extended in the horizontal plane. Alternative words for boom are arm, robotic arm, member, beam.

Throughout the description and claims the wording "passively adjustable" must be interpreted as adjustable under the influence of external forces, i.e., the movement (i.e. pitch, roll, yaw, heave, sway, and surge) of a floating vessel when docked to the shore. This means that when the main boom is passively adjustable due to movements of the floating vessel that the main boom does not create intentional counterforces to dampen or counteract these movements.

Throughout the description and claims the wording "transport boom" must be interpreted as a structure that comprises an arm extended in the horizontal plane which can move an object handler, or on which an object handler can be guided along. Alternative words for transport boom are arm, robotic arm, member, beam, guide.

Throughout the description and claims the word "coupling" must be interpreted as a connection between two booms. It can be a fixed coupling, or a movable or slidable coupling. Alternative words for coupling are connection, lock or joint.

Throughout the description and claims the wording "telescopic joint" must be interpreted as a movable connection between two members, wherein one is slidable inside the other member. Alternative words for telescopic joint are telescopic connection and telescopic coupling.

Throughout the description and claims the wording "floating vessel" must be interpreted as a vessel floating on a body of water. Alternative words for floating vessel are marine vessel, high-speed vessel, ferry, ship, boat, barge, and raft.

Throughout the description and claims the wording "floating platform" must be interpreted as a platform floating on a body of water. Alternative words for floating vessel are barge, raft, pontoon, base and buoy.

Throughout the description and claims the wording "transport apparatus" must be interpreted as any apparatus that can receive the object and move it within reach of the object handler or outside the reaching of the object handler. Alternative words for transport apparatus are platform, rotatable carousel, movable platform, conveyor belt, vehicle, robot storage facility, fork-lift, crane, and rack-and-pinion system.

In an embodiment of the transport system according to the invention the transport boom is movably mounted to the main boom. This embodiment is advantageous because the sliding of the transport boom relative to the main boom compensates for the dynamic length adjustments of the span of the main boom.

In an embodiment of the transport system according to the invention, the system further comprises at least two couplings between the transport boom and the main boom. At least one of the couplings is configured for actuating the transport boom for adapting a position of the transport boom relative to the main boom. This enables control of the position of the transport boom relative to the main boom. The relative movement of the transport boom in relation to the main boom means that the transport boom can be shorter than the main boom and still have the same span as the main boom, as it can be moved back and forth across the length of the main boom. It facilitates an increased range for the transport of objects along the main boom.

In a further embodiment of the transport system according to the invention, the far end of the main boom comprises a vertical support for resting on the other one of the storage area and the target area. This embodiment constitutes a simple way of ensuring at least one rotational degree of freedom between the main boom and the other one of the storage area and the target area. As a result, the main boom may pivot relative to the area where it is supported.

In another embodiment of the transport system according to the invention, the vertical support is extendable in length. This facilitates the operation of placing the vertical support on the area it is supported. The vertical support can also be shortened in length and take up less space when the transport system is not in operation.

In another embodiment of the transport system according to the invention, the main boom comprises a first sub-boom and a second sub-boom pivotably connected to the first sub-boom. This allows for the adjustment of the span of the main boom, thus allowing the transport system to compensate for vessel movements.

In one embodiment, the main boom is foldable, for instance in a vertical direction or in a horizontal direction. These two implementations of the transport system enable the adjustment of the span of the main boom, allowing the transport system to compensate for vessel movements. The main boom that is foldable in the vertical direction may be called a knuckle-boom, which is a term that is known from the technical field of cranes.

In an embodiment in accordance with the invention, the main boom comprises at least one telescopic joint. This constitutes an alternative configuration to the knuckle-boom and the horizontally foldable boom for the system to allow for the adjustment of the span of the main boom by enabling the adjustment of the length of the main boom. A significant advantage of this embodiment is that the boom will take up less space when the transport system is contracted and not in operation.

An embodiment of the transport system in accordance with the invention, the main boom comprises at least two telescopic joints for allowing the adjustment of the span of the main boom. This embodiment allows for further option for the adjustment of the length of the main boom. In addition, the boom can be made even shorter while the system is not in operation, while the span of the boom can be as large as the boom with one telescopic joint.

In a further embodiment of the transport system in according to the invention, the movement of each of the two telescopic joints is controlled by an actuator. The actuators may be based on hydraulic cylinders, or they may be electrical driven actuators.

In an embodiment of the transport system in accordance with the invention, each actuator has a locking mode and a free-float mode. While the actuator is in the locking mode, said actuator is stiff for locking the position of its respective telescopic joint. While the actuator is in the free-float mode, said actuator can freely extend or contract for allowing for the passive adjustment of the length of the span of the main boom. The advantage of this embodiment is that it allows for switching between said modes depending on the actual requirements, i.e., stability vs flexibility. As the object handler is at end of the main boom at for example the target side, the actuator of the telescopic joint on the opposite side, that is the storage area, can be in a free-float mode, while the actuator of the telescopic joint on the target side can be in a locking mode. In this way, the telescopic joint farthest away from the object handler can move freely and thus compensate for vessel movements, while the locked position of the telescopic joint closest to the object handler bring about a stable configuration that is advantageous for when the object handler will grip and lift the object from the target area. As the object handler is moved towards the storage area, the actuator at the side of the storage area switch from a free-float mode to a locking mode, and the actuator at the side of the target area switch from a locking mode to a free-float mode. The main boom is therefore adjustable in length at the side of the target area, allowing for compensation of vessel movements, while the main boom is stable at the storage area side, facilitating the placement of the object by the object handler at the storage area.

In an embodiment of the transport system according to the invention, the object handler is movable relative to the transport boom and provided with an actuator for manipulating the position of the object handler relative to the transport boom. The advantage of this embodiment is that the movement of the object handler on the transport boom can be controlled for transport of the object between the storage area and target area. It also increases the range for transferring the objects.

In an embodiment of the transport system according to the invention, a length of the object handler is adjustable for facilitating picking up or releasing of the object. The height adjustability should be such that there is enough clearance between the object and the floor onto which the object is standing. In a prototype of the transport system the clearance is designed to be 300 mm, which then determines the length adjustability of the object handler to be at least 300 mm.

In an embodiment of the transport system according to the invention, the object handler is configured for gripping or releasing a gripping interface of the object. This facilitates the lifting part of the transport operation and is easy to automate.

In a variant of the embodiment wherein the object handler has a variable length, the object handler may have a fixed length instead. In this embodiment, in order to get clearance between the object and the floor onto which the object is standing the respective floor, can be made height adjustable (instead of the object handler) to create the necessary clearance and allow the object handler to move the object along the transport boom. This of course applies to both the storage area and the target area. In a further combination both the object handler and the respective floor are adjustable in length or height.

In an embodiment of the transport system in accordance with the invention, the object handler comprises a mechanical gripper for gripping the gripping interface of the object.

In an embodiment of the transport system in accordance with the invention, the object handler comprises a vacuum head for gripping the gripping interface of the object.

In an embodiment of the transport system, the object handler is controllably rotatable for manipulating the orientation of the object when suspended from the object handler. The advantage of this embodiment is that it facilitates the placement of the object on the target area or the storage area. This process will also make the transport operation faster.

In an embodiment of the transport system in accordance with the invention, the system further comprises a transport apparatus at the storage area for receiving the object and moving it within reach of the object handler or outside the reach of the object handler. This embodiment of the transport system is advantageous for when several objects are to be transported between the storage area and the target area. In the case of the transport system being used for transferring battery packs between a floating vessel and the shore, the transport apparatus can facilitate the further transport of the battery packs from the storage area on shore to for example a charging station for charging used battery packs. A charging station for charging empty battery packs may be integrated with the transport apparatus on shore. The transport apparatus on the storage area on the floating vessel can be configured for being in electrical connection with an electrical motor of the floating vessel.

In an embodiment of the transport system in accordance with the invention, the system further comprises a further transport apparatus at the target area for receiving the object and moving it within reach of the object handler or outside of reaching of the object handler. This embodiment of the transport system is advantageous for when several objects are to be transported between the storage area and the target area. In the case of the transport system being used for transferring battery packs between a floating vessel and the shore, the further transport apparatus can facilitate the further transport of the battery packs from the target area on shore to for example a charging station for charging used battery packs. A charging station for charging empty battery packs may be integrated with the further transport apparatus on shore. The further transport apparatus on the target area on the floating vessel can be configured for being in electrical connection with an electrical motor of the floating vessel.

In an embodiment of the transport system in accordance with the invention, the transport apparatus and/or the further transport apparatus can be selected from a group consisting of a platform, rotatable carousel, a movable platform, a conveyor belt, a vehicle, a robot storage facility, a fork-lift, a crane, and a rack-and-pinion system. As described above, this embodiment of the invention is advantageous for when several objects are to be transported between the storage area and the target area. In the case of the rotatable carousel, the object handler places the object on an empty space on the carousel, releases the object and is moved upwards to create space between the object and the object handler. The carousel then rotates so that a second object is placed underneath the object handler, making it available for gripping and lifting by the object handler. Similarly, a conveyor belt can remove a transferred object from underneath the object handler, and a second object to be transferred can be placed underneath the object handler for a second transfer operation. The movable platform may be movable in a direction substantially orthogonal to the direction of the transport of the objects between the storage and the target area.

In a further embodiment of the transport system in accordance with the invention, the transport apparatus and/or the further transport apparatus comprises a housing for storing the objects, wherein the housing comprises doors. The housing protects the objects against bad weather conditions such as wind and rain. The doors may be opened so that the object handler may be able to grab the object and lift it from the transport apparatus or the further transport apparatus.

In a further embodiment of the transport system in accordance with the invention, one of the storage area and the target area is placed on a floating vessel or floating platform. In the case of a floating vessel, the target area and storage area should preferably be placed such that the pedestal supporting the main boom is not placed on the vessel. The pedestal supporting the main boom could nevertheless be placed on the vessel, but that would increase the load on the vessel leading to increased energy consumption when the vessel is in operation. It is nevertheless possible, and furthermore, if a large floating platform is serving as storage area, this problem is not relevant.

In another embodiment of the transport system according to the invention, the other one of the storage area and the target area is placed on a further floating vessel or a floating platform. In the case when one of the storage area or the target area is placed on a floating vessel or a platform, it would be advantageous to have a mechanism in the system for adjusting for tidal conditions and/or loading condition of the floating vessel or platform. By placing the other one of the storage area and the target area on a further floating vessel or floating platform, there would be no need for tidal and/or loading condition adjustments.

In an embodiment of the transport system according to the invention, the transport apparatus is adjustable in height. In a further embodiment of the transport system the further transport apparatus is adjustable in height. This height adjustment enables accommodations for tidal changes and/or loading condition of the floating vessel. Alternatively, this height adjustability may be used to bring the object within reach of the object handler (that is to close the clearance with the object and the floor), or to receive the object from the object handler. This is particularly useful in embodiments where the object handler is not adjustable in length.

In a further embodiment of the transport system the pedestal is adjustable in height. This height adjustment enables accommodations for tidal changes and/or loading condition of the floating vessel.

In an embodiment of the transport system according to the invention, the other one of the storage area and the target area comprises a support configured for receiving the end of the main boom or the vertical support of the main boom. This embodiment is advantageous because it could further stabilise the mechanic link between the main boom and the support and make easier the connection operation between the main boom and the other one of the storage area and the target area.

In an embodiment of the transport system according to the invention, the vertical support comprises a ball and the support of the other one of the storage area and the target area comprises a ball socket, for forming a ball joint together with the ball when in contact with the vertical support. The advantage of this embodiment is that the ball joint forms a pivotable connection between the vertical support and the support of the other one of the storage area and the target area, while maintaining a mechanical link between the two parts.

In an embodiment of the transport system according to the invention, the transport system further comprises a control system for controlling the transport system. It is possible to create a fully automated system using the control system. The detailed description further discusses ways to build such control system.

BRIEF INTRODUCTION OF THE FIGURES

In the following is described examples of embodiments illustrated in the accompanying figures, wherein.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the figures for purposes of explanation only and to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The invention will be discussed in more detail with reference to the figures. The figures will be mainly discussed in as far as they differ from previous figures.

Figure 1:
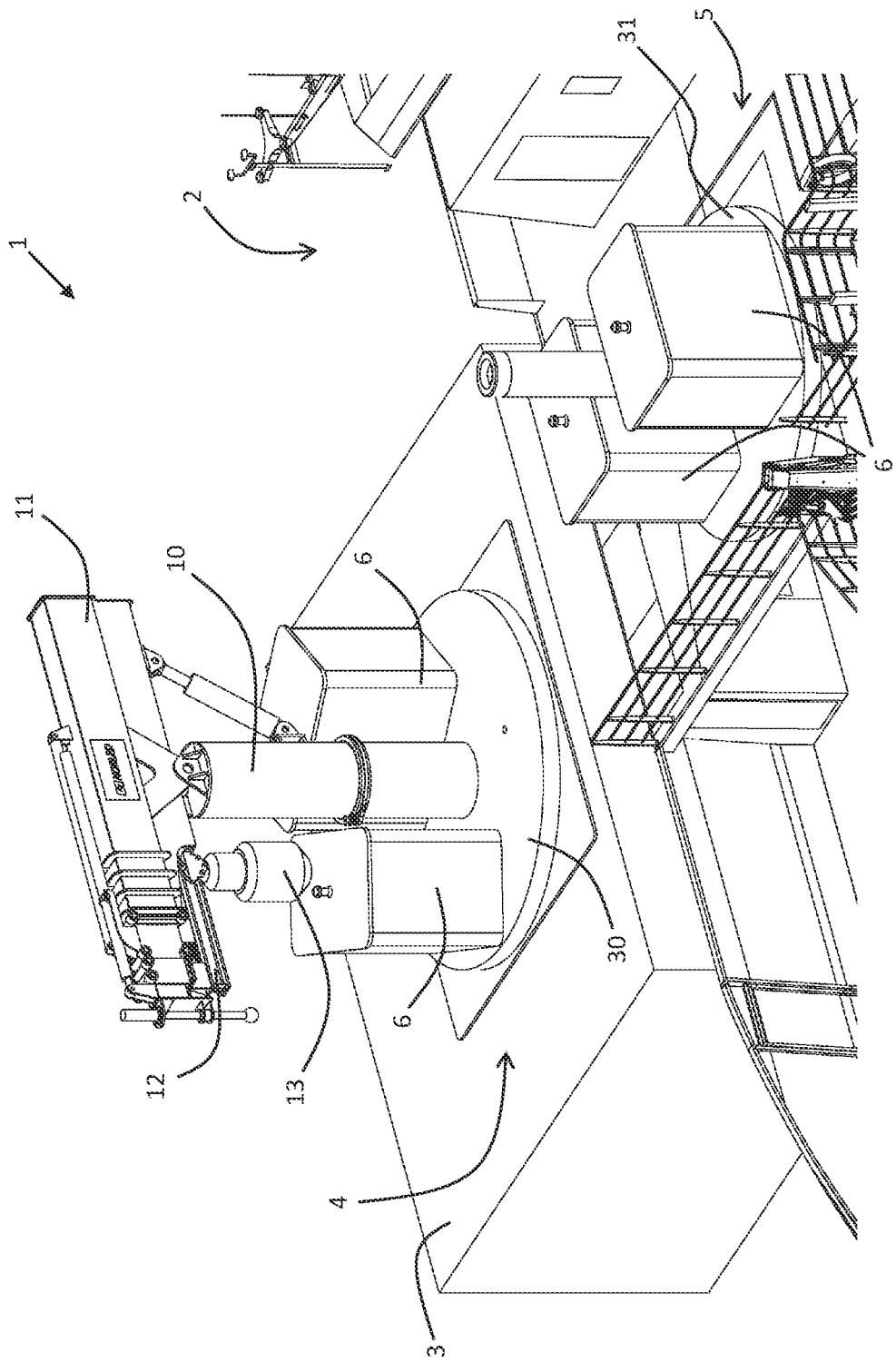
FIG. 1 shows a transport system in a parked mode, wherein a pedestal is placed at a storage area on shore and a target area is located on a floating vessel.

FIG. 1 shows a transport system 1 in accordance with an embodiment of the invention. The transport system 1 is made for transporting objects 6 between a storage area 4, here the shore or quay 3, and a target area 5, here a floating vessel 2 such as a ferry. In the illustrated examples the storage area is placed on the quay or shore 3. In this embodiment the objects are battery packs. However, the invention may also be used for transporting any other type of cargo. Furthermore, in this embodiment the transport system 1 is used for swapping empty battery packs 6 at the target area 5 with fully charged battery packs 6 at the storage area 4. The battery packs 6 are stored on a transport apparatus 30 on the storage area 4 and on a further transport apparatus 31 on the target area 5. In this embodiment the two transport apparatuses 30, 31 comprise rotatable carousels. The transport system 1 further comprises a pedestal 10 placed on the storage area 4 and a main boom 11 that is pivotably connected to the pedestal 10. FIG. 1 shows the transport system 1 in a parked position, with the main boom 11 being contracted so as to minimise the volume of the main boom 11. In the parked position, the main boom 11 is parallel to the shore 3. The transport system 1 further comprises a transport boom 12 connected to the main boom 11. The main boom 11 and the transport boom 11 extend in the same direction. In the parked position, the transport boom 12 can be withdrawn inside a receiving part of the main boom 11 that receives the transport boom 12 in order to minimise the volume of the main boom 11. An object handler 13 is coupled to and movable along the transport boom 12, and it is configured for handling the battery pack 6 for transport between the storage area 4 and the target area 5.

Figure 2:
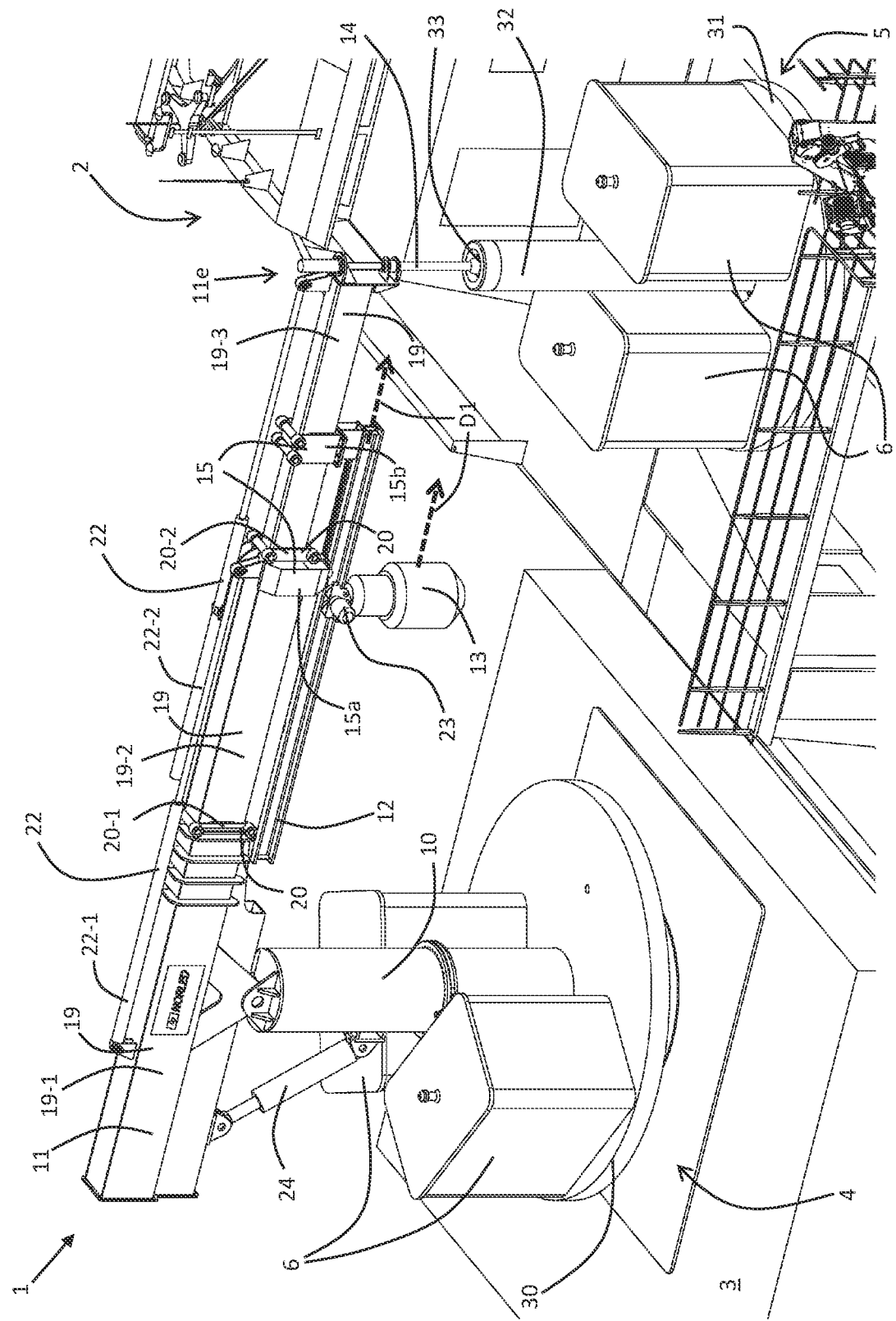
FIG. 2 shows the transport system of FIG. 1 in operation, wherein a main boom is supported by a support on the floating vessel and an object handler is being moved towards the target area.

FIG. 2 shows the transport system 1 of FIG. 1 in operation. The main boom 11 is rotated 90° in a substantially horizontal plane, compared to its position in the parked mode and is now extending towards the floating vessel 2. The carousel 30 and the pedestal 30 are elevated compared to their respective position in the parked mode. The main boom 11 comprises three sections 19-1, 19-2, 19-3, coupled by two telescopic joints 20: 20-1, 20-2. In FIG. 2 an inner section 19-1 is coupled with a middle section 19-2 by an inner telescopic joint 20-1, and the middle section 19-2 is coupled with an outer section 19-3 on its other side by an outer telescopic joint 20-2. The joints 20-1, 20-2 are both extended so that a far end 11e of the main boom 11 is located above the target area 5. In this embodiment the far end 11e comprises an extendable vertical support 14. The target area 5 comprises a support 32 configured for receiving the vertical support 14. The extendable vertical support 14 is supported by the support 32 and forms a pivotably coupling therewith, i.e., these components together form a ball joint 33. This pivotable coupling ensures that the floating vessel 2 can roll and pitch freely. The transport system 1 further comprises a tilt actuator 24 between the pedestal 10 and the main boom 11. When the vertical support 14 is supported by the support 32 on the floating vessel 2, the tilt actuator 24 is in a free-float mode to ensure that the main boom 11 can pivot freely in order to follow the floating vessel's 2 movement in the vertical direction. The pivotable couplings between the extendable vertical support 14 and the support 32, and between the main boom 11 and the pedestal 10 allow the system to tolerate vessel movements without a translational movement of the vertical support relative to the support 32, and without a translational movement of the main boom 11 relative to the pedestal 10. Each telescopic joint 20 is controlled by a telescopic actuator 22. The telescopic actuators 22 are parallel to the main boom 11. One end of an inner telescopic actuator 22-1 is connected to the inner section 19-1 and the other end of the inner telescopic actuator 22-1 is connected to the middle section 19-2. Similarly, one end of an outer telescopic actuator 22-2 is connected to the middle section 19-2 and the other end of the outer telescopic actuator 22-2 is connected to the outer section 19-3. Each telescopic actuators 22 can lock a position of its telescopic joint 20, or be in a free-float mode, allowing for passive movement of its telescopic joint 20 of the main boom 11. As the object handler 13 is closer to the far end 11e of the main boom 11 than the pedestal 10, the outer telescopic actuator 22-2 is in a locking mode, while the inner telescopic actuator 22-1 is in a free-float mode. This ensures minimal movement between the target area 5 and the object handler 13 when the object handler 13 is close to the floating vessel 2, facilitating the gripping and lifting of the battery pack 6 from the carousel 31. At the same time, the allowed passive movement of the inner telescopic joint 20-1 can compensate for movements of the floating vessel 2. In FIG. 2, the transport boom 12 comprises a rail and is connected to the main boom 11 by two couplings 15. The transport boom 12 is slidable relative to the main boom 11. One of the couplings 15 is a linear actuator 15a for the transport boom 12, configured for moving the transport boom 12 back and forth relative to the main boom 11. The linear actuator 15a is connected to the middle section 19-2, while the other coupling 15 is a slidable coupling 15b connecting the transport boom 12 with the outer section 19-3, ensuring that the transport boom 12 can move along the outer section 19-3 on the main boom 11. The object handler 13 is movable along the rail of the transport boom 12 and comprises an object handler actuator 23 for manipulating the position of the object handler 13 relative to the transport boom 12. In FIG. 2. The object handler 13 and the transport boom 12 are moving in a direction D1 towards the floating vessel 2. The actuators 22, 23 and 24 can comprise hydraulic cylinders or electrical actuators, such as linear actuators.

Figure 3:
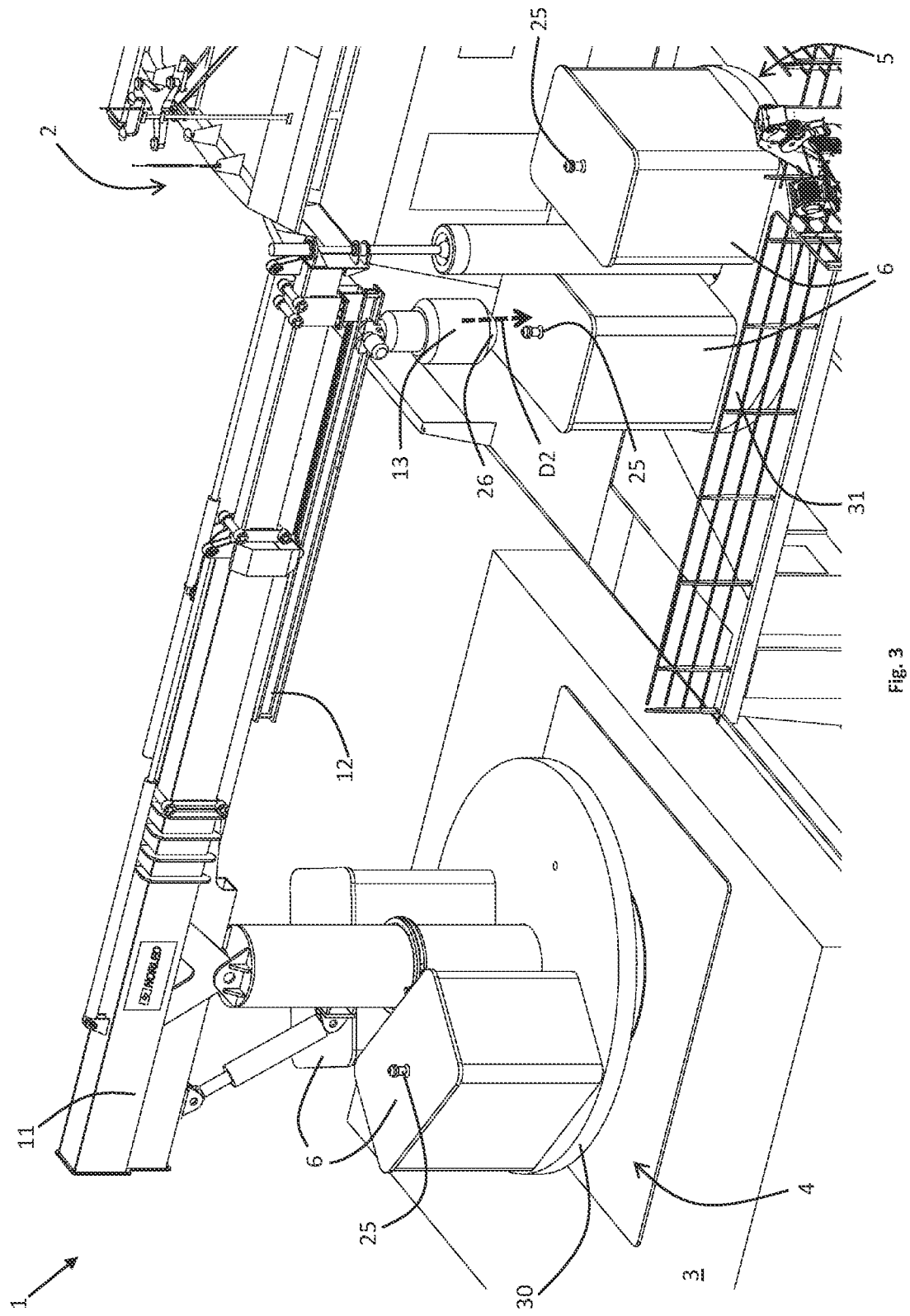
FIG. 3 shows the transport system of FIG. 1 in operation, wherein the object handler has been moved to the floating vessel, and the object handler is ready to pick up an object to be transported.

FIG. 3 shows the transport system 1 of FIG. 1 in operation wherein the transport boom 12 and the object handler 13 are moved relative to the main boom 11 so that the object handler 13 is located above an empty battery pack 6 placed on the carousel 31 at the target area 5 on the floating vessel 2. The object handler 13 is configured with a locking system 26 configured for gripping and releasing a gripping interface 25 of the battery pack 6. The object handler 13 is lowered in a direction D2 so that the locking system 26 may be locked onto the gripping interface 25. The lowering and lifting of the object handler 13 can be controlled by, for example, a system comprising hydraulic cylinders or by a jacking system. As already mentioned in the introductory portion of the specification, in alternative embodiments, the object handler 13 is not lowered or lifted, but rather fixed in length, while the respective "floor" onto which the battery pack (object) 6 is standing or landing is adjustable in height, such that the object handler 13 only needs to grip or release the battery pack 6. The locking system 26 of the object handler 13 can comprise a mechanical gripper or a vacuum head for gripping the gripping interface 25.

Figure 4:
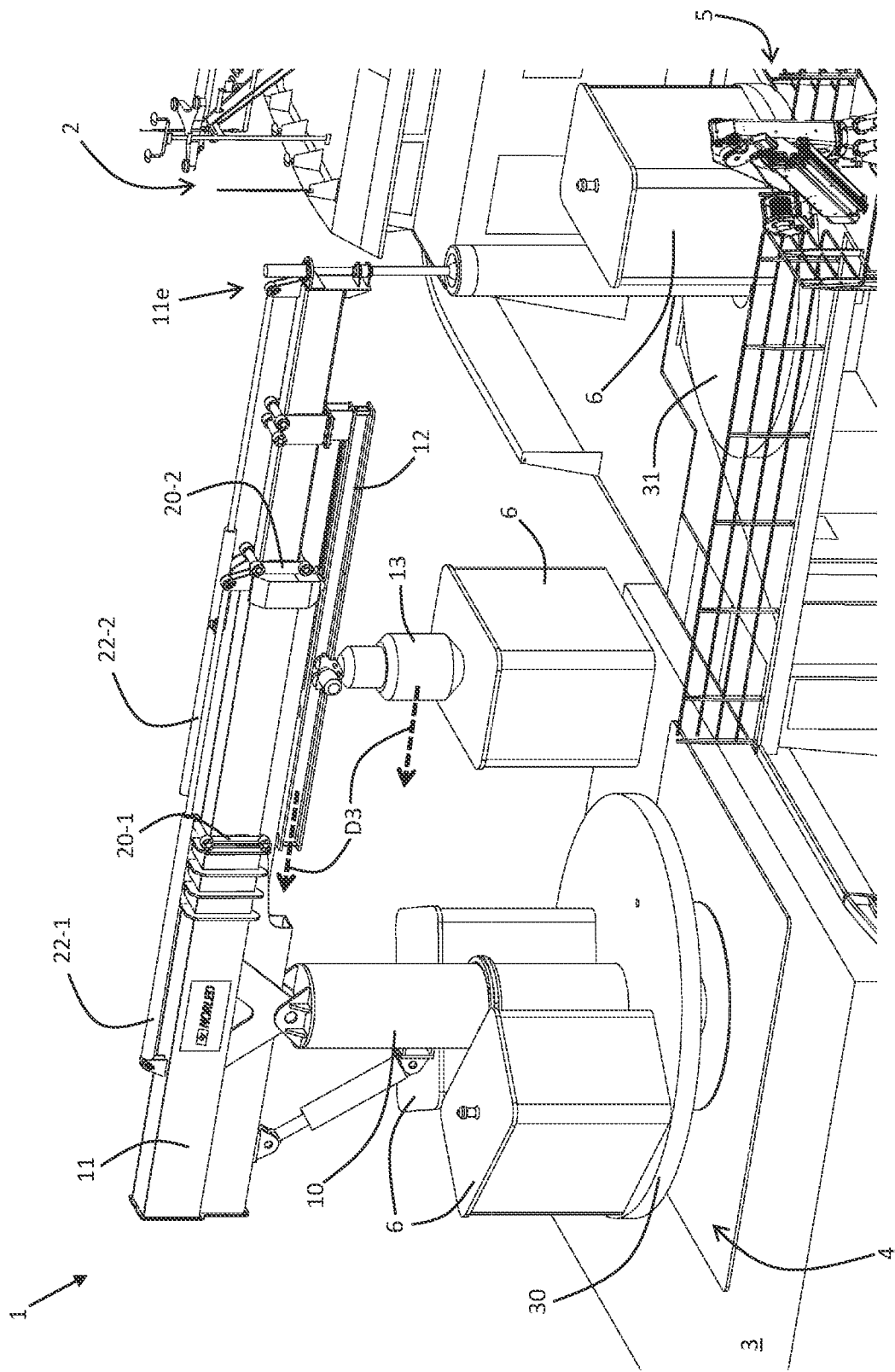
FIG. 4 shows the transport system of FIG. 1 in operation, wherein the object handler is lifting the object, and wherein the object is being moved towards the shore side.

FIG. 4 shows the transport system 1 wherein the object handler 13 is lifting the battery pack 6, and the object handler 13 carrying the battery pack 6 is being moved towards the shore 3 in a direction D3. At the same time, the transport boom 12 is being moved in the same direction D3. When the object handler 13 is closer to the pedestal 10 than the far end 11e of the main boom 11, the inner telescopic actuator 22-1 switches from a free-float mode to a locking mode. Contrary, the outer telescopic actuator 22-2 switches from a locking mode to a free-float mode so that the outer telescopic joint 20-2 can move passively and thus compensate for movements of the floating vessel 2. The locked position of the inner telescopic joint 20-1 allows for minimal movement between the object handler 13 carrying the empty battery pack 6, and the carousel 30 on shore 3. As the object handler 13 carrying the battery pack 6 is moved towards the storage area 4, the object handler 13 can manipulate the orientation of the battery pack 6 to facilitate the placement of the battery pack 6 on the storage area 4.

Figure 5:
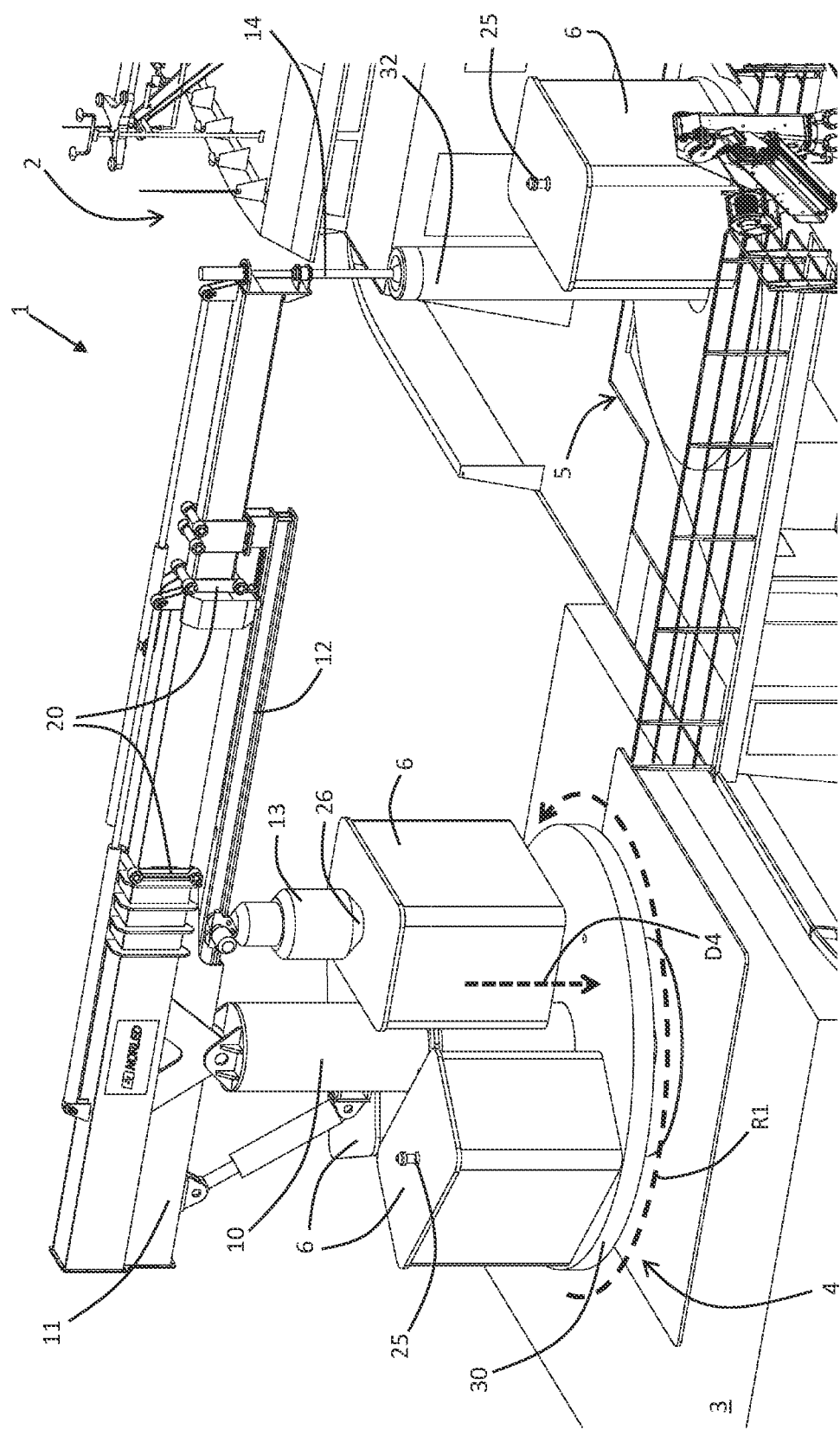
FIG. 5 shows the transport system of FIG. 1 in operation, wherein the object handler is lifting the object, and wherein the object has been transported to the shore side, ready to be placed on the storage area.

FIG. 5 shows the transport system 1 wherein the transport boom 12 and the object handler 13 are moved relative to the main boom 11 so that the object handler 13 carrying the battery pack 6 is located above an empty space on the carousel 30. Both the transport boom 12 and the object handler 13 has been moved even further towards the pedestal 10 compared to their respective positions in FIG. 4. The object handler 13 is lowered down to place the empty battery pack 6 on the carousel 30 in a direction D4. The locking system 26 releases the gripping interface 25 of the battery pack 6. The object handler 13 is retracted upwards and is ready to grip and lift a new, fully charged battery pack 6 to be transferred to the floating vessel 2. In this embodiment, the carousel 30 is rotatable around a central vertical axis, as illustrated by the rotational direction R1 in FIG. 5. The carousel 30 can be rotated to place a fully charged battery pack 6 under the object handler 13. The object handler 13 is then lowered down again to lock into the gripping interface 25 of the fully charged battery pack 6, and the transport operation as described above can be used to move the battery pack 6 to the target area 5 on the floating vessel 2. When all the transport operations are completed, the vertical support 14 is retracted from the support 32, the telescopic joints 20 are contracted to minimise the range of the main boom 11 and the main boom 11 can be rotated back to the parked position as shown in FIG. 1.

Figure 6:
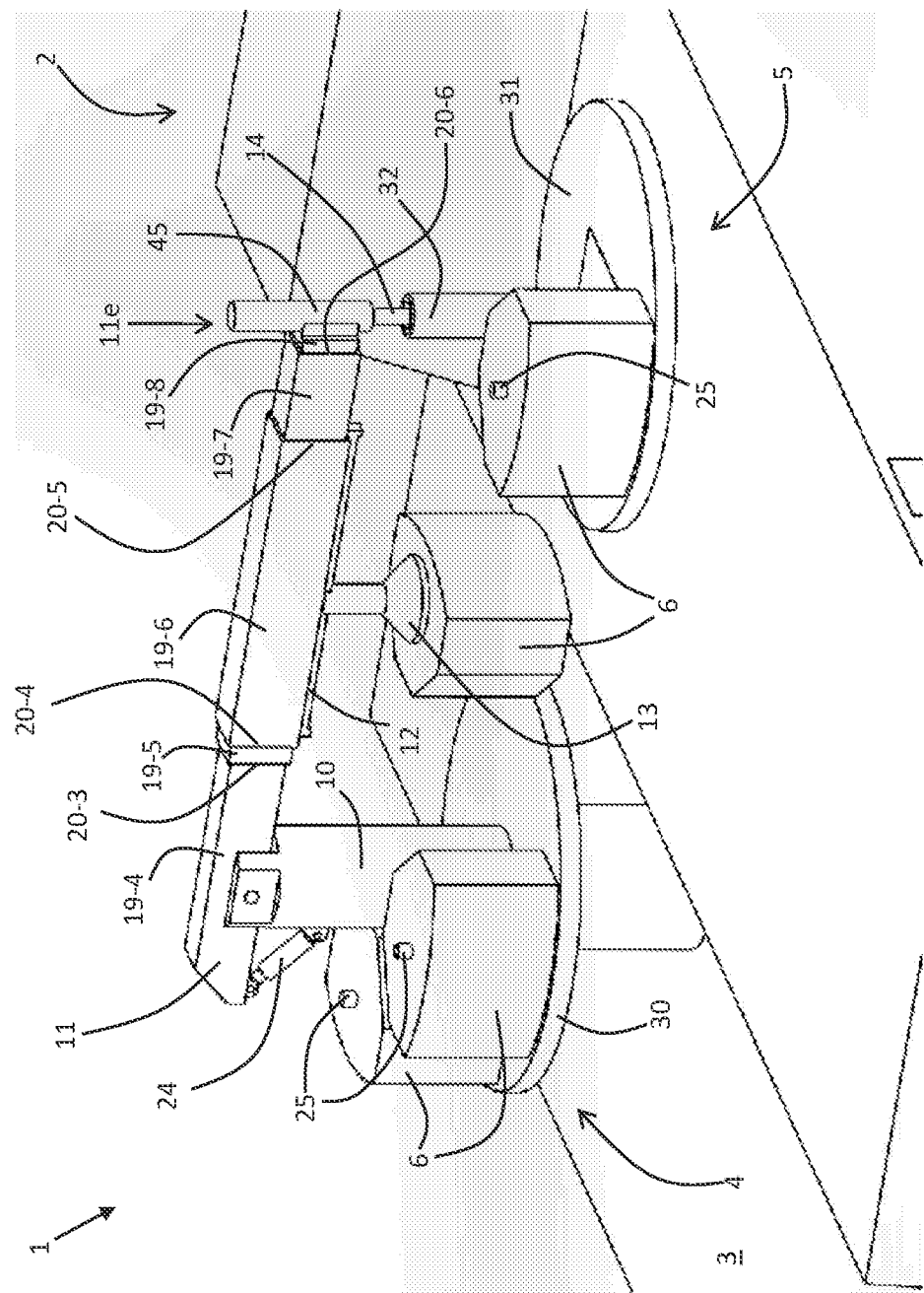
FIG. 6 shows an alternative transport system wherein the transport boom is integrated with the main boom.

FIG. 6 shows another embodiment of the transport system 1. In this embodiment, the main boom 11 comprises five sections 19-4, 19-5, 19-6, 19-7, 19-8 connected by four telescopic joints 20-3, 20-4, 20-5, 20-6. The figure shows a first section 19-4 being coupled with a second section 19-5 by a first telescopic joint 20-3, the second section 19-5 being coupled with a third section 19-6 by a second telescopic joint 20-4, the third section 19-6 being coupled with a fourth section 19-7 by a third telescopic joint 20-5, and the fourth section 19-7 being coupled with a fifth section 19-8 by a fourth telescopic joint 20-6, as illustrated. The telescopic joints 20-3, 20-4, 20-5, 20-6 can extend and contract by the use of hydraulic cylinders or other type of actuators. The actuators may be installed on the sides of the main boom 11, on the top of the main boom 11 as shown in FIGS. 1-5, or inside the sections 19-4, 19-5, 19-6, 19-7, 19-8. In this embodiment, the transport boom 12 is integrated with the third section 19-6 such that it is not movable relative to the third section 19-6. The object handler 13 can be moved along the transport boom 12. In this embodiment the length of the span of the main boom 11 is adjustable similar to what is previously discussed. Also, the main boom 11 is similarly supported at both the storage area 4 and the target area 5. The reason for having more telescopic joints 20 in this embodiment is to ensure that the object handler 13 has enough reach to pick up the objects 6. More telescopic joints 20 on each side give the third section 19-6 more movability.

The embodiment of FIG. 6 may be operated as follows. When the object handler 13 is close to the target area 5, the fourth telescopic joint 20-6 is in a locked position while the first telescopic joint 20-3 is in a free-float mode. The third section 19-6 is moved towards the far end 11*e* of the main boom 11 if the object handler 13 is to be moved towards the target area 5. The second and third telescopic joints 20-4, 20-5 are locked when the third section 19-6 is in a suitable position for the object handler 13 to be above a position on the carousel 31 for either gripping and lifting a battery pack 6 or for placing and releasing a battery pack 6 onto the carousel 31. When the object handler 13 is close to the storage area 4, on the other hand, the first telescopic joint 20-3 is in a locked position while the fourth telescopic joint 20-6 is in a free-float mode. Similarly, the third section 19-6 is moved towards the pedestal 10 if the object handler 13 is to be moved towards the storage area 4. When the object handler 13 is close to the storage area 4, the first telescopic joint 20-3 is in a locked position while the fourth telescopic joint 20-6 is in a free-float mode. The second and third telescopic joints 20-4, 20-5 are locked when the third section 19-6 is in a suitable position for the object handler 13 to be above a position on the carousel 30 for either gripping and lifting a battery pack 6 or for placing and releasing a battery pack 6 onto the carousel 30.

This embodiment also shows another solution for the support of the far end 11*e* of the main boom 11 on the target area 5. The vertical support 14 is made actuatable, but its components and its functionality are otherwise identical to the vertical support 14 in FIGS. 1-5. The vertical support 14 is lowered into the support 32 on the target area 5. The vertical support 14 is controlled by a support actuator 45 (here implemented as a piston rod of a cylinder). When the fourth telescopic joint 20-6 is in a locked position, so is the support actuator 45, ensuring a stable geometry between the object handler 13 and the target area 5. When the support actuator 45 is in a locked position, the tilt actuator 24 is in a free-float mode, and together with the passive movement of the first telescopic joint 20-3, it ensures that the floating vessel 2 can roll, pitch, heave, and move freely. Similarly, when the first telescopic joint 20-3 is in a locked position, so is the tilt actuator 24 between the pedestal 10 and the main boom 11. This ensures a stable geometry between the object handler 13 and the storage area 4. The support actuator 45 and the fourth telescopic joint 20-6 are then in a free-float mode, allowing for the system to compensate for movement of the floating vessel 2. As the object handler 13 carrying the battery pack 6 is moved between the storage area 4 and the target are 5, the object handler 13 can manipulate the orientation of the battery pack 6 to facilitate the placement of the battery pack 6 on the carousels 30, 31. The actuators 24, 45 can comprise hydraulic cylinders or they can be electrically driven.

The parts of the transport system illustrated in FIGS. 1-6 may have the following approximate dimensions. The length of the main boom 11 may be 6.5 m when in the parked position, and 13 m when the telescopic joints 20 are fully extended. The length of the inner section 19-1 may be 5 m, the lengths of the middle section 19-2 and the outer section 19-3 may be 4 m. The transport boom 12 may be 6 m in length. The total height of the pedestal 10 and the main boom 11 may be approximately 7 m. The height of the vertical support 14 may be up to 1 m when fully extended, and the height of the support 32 may be 2.5 m. The object handler 13 may have a diameter of 1 m and a height of 1.5 m. The battery pack 6 may be 2.5 m in length, 1.6 m in width and 1.7 m in height and it may have a weight of 10 ton. The rotatable carousels 30, 31 may have a diameter of 5.1 m.

Figure 7:
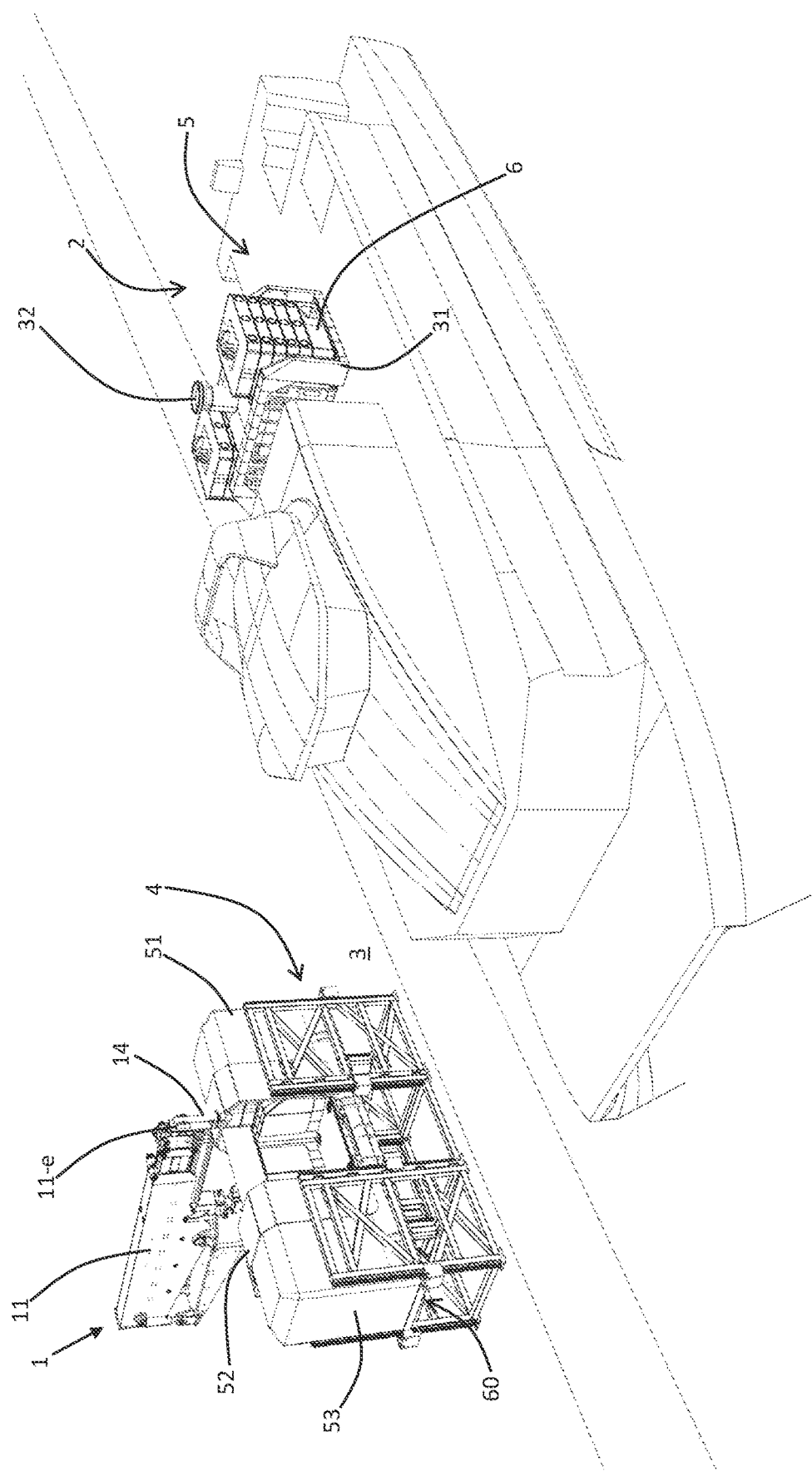
FIG. 7 shows an alternative transport system wherein the transport apparatus comprises a movable platform.

FIGS. 7-11 show an alternative transport system 1 wherein the transport apparatus on the shore 3 comprises a platform 60. FIG. 7. shows the transport system 1 and a floating vessel 2 approaching the shore 3 where the storage area 4 is located. The battery packs 6 are stored on the platform 60 on the shore 3, and on a rotatable carousel 31 on the floating vessel 2. Similar to the earlier-discussed embodiments, the far end 11*e* of the main boom 11 comprises a vertical support 14 and the target area 5 on the floating vessel 2 comprises a support 32 configured for receiving the vertical support 14. The vertical support 14 is supported by the support 32 and forms a pivotably coupling therewith.

Figure 8:
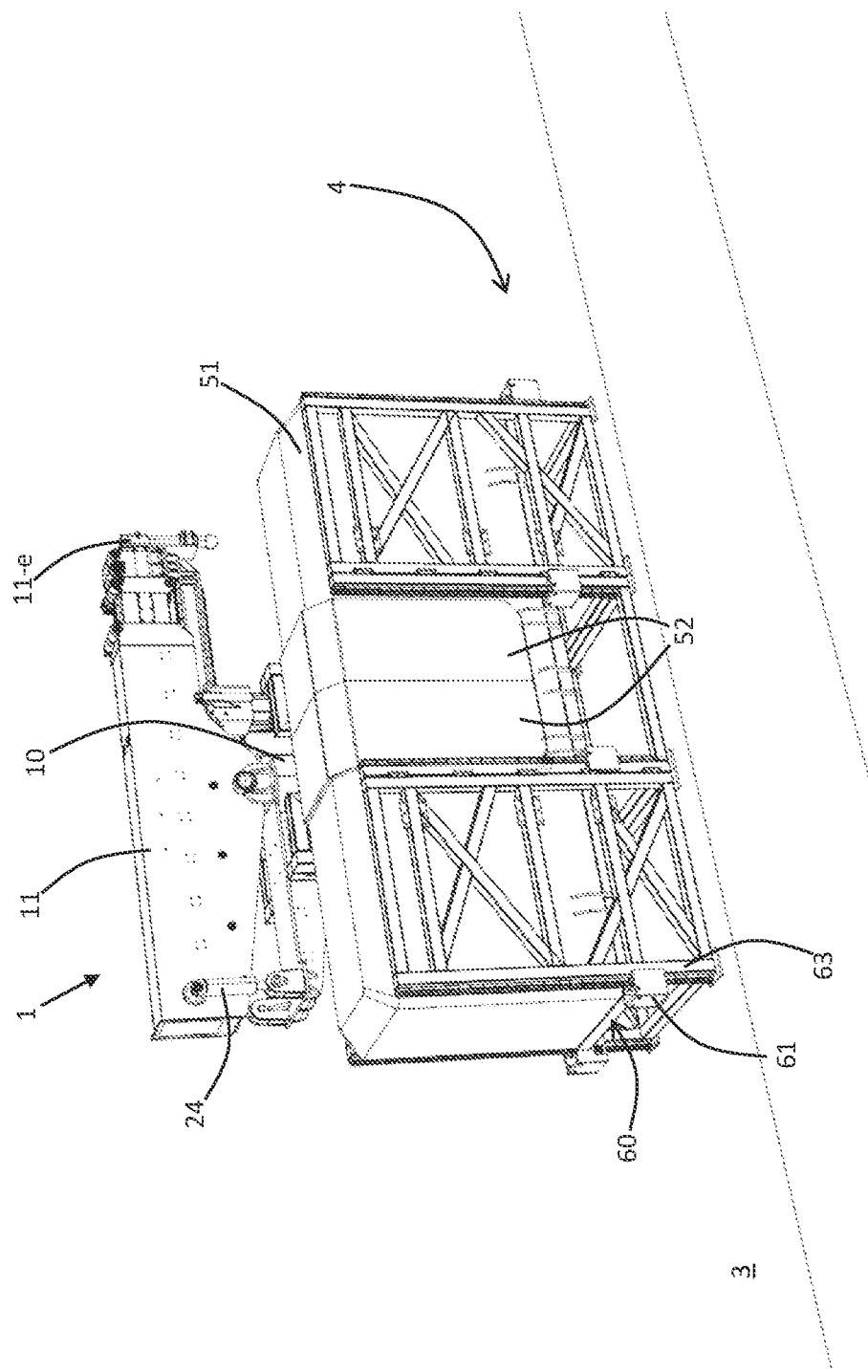
FIG. 8 shows the transport system of FIG. 7 in a parked mode.

FIG. 8 shows the transport system 1 in a parked mode. The main boom 11 is contracted so as to minimise the volume of the main boom 11. In the parked position, the main boom 11 is parallel to the shore 3.

The platform 60 comprises lifting mechanisms 61 configured for lifting and lowering the platform 60. The lifting mechanisms 61 may lift and lower the platform along vertical beams 63 as shown in FIGS. 8-11. In other examples the platform may be lifted and lowered by other lifting mechanisms, such as a scissor lift. The platform 60 is in a lowered position when the transport system 1 is in the parked mode. The transport apparatus further comprises a housing 51 which is connected to the lifting mechanisms 61 so that the housing 51 may be lifted and lowered with the platform 60. The housing 51 may also be fastened to the platform 60. The housing 51 may shelter the battery packs 6 from for example wind and rain during storing and charging of the battery packs 6. The housing 51 comprises two slidable mid doors 52 that are closed when the transport system 1 is in the parked mode.

Figure 9:
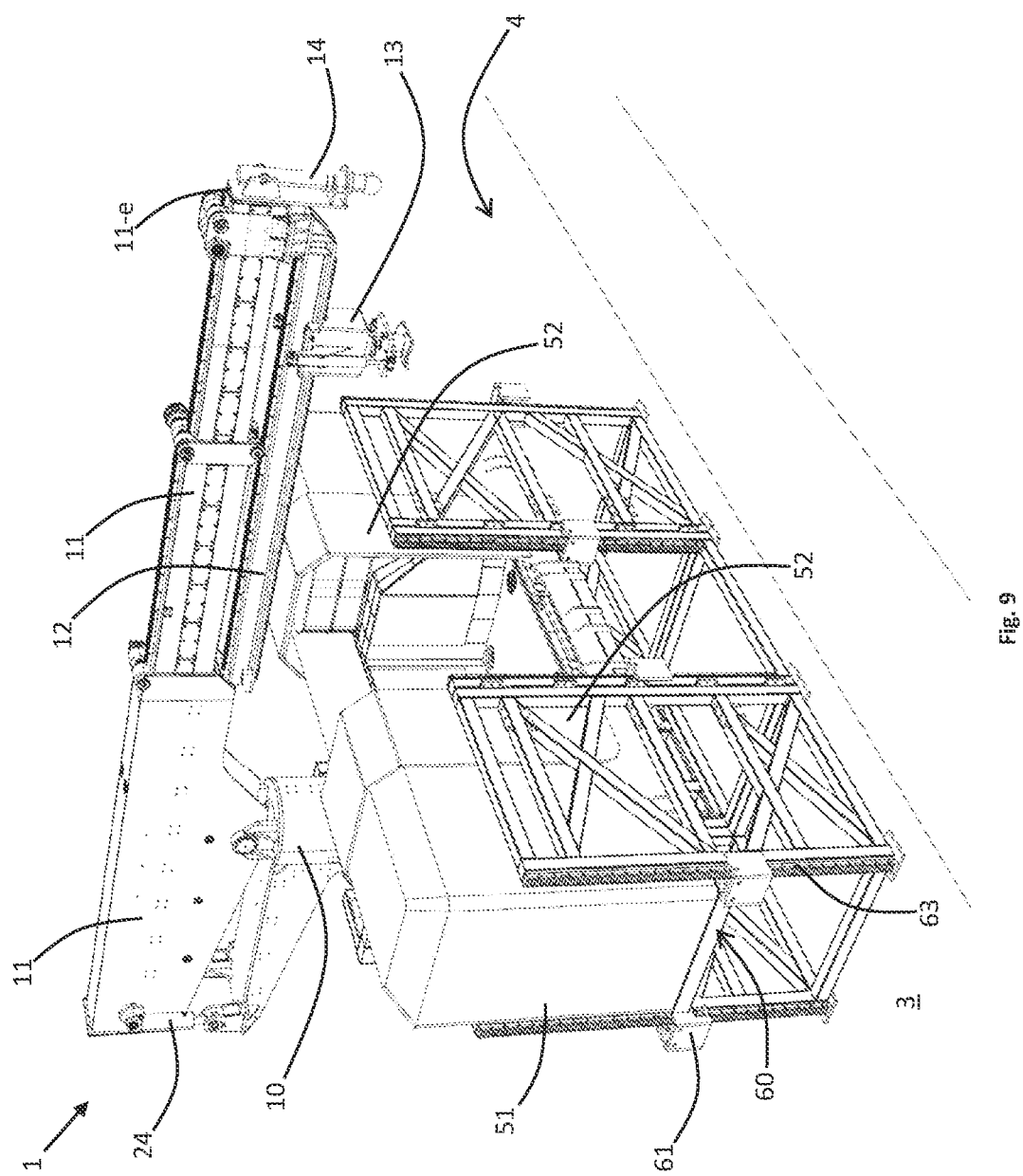
FIG. 9 shows the transport system of FIG. 7 in operation, wherein the main boom is rotated, the platform is elevated, and the main boom is extended.

FIG. 9 shows the transport system 1 in operation. The main boom 11 is rotated 90° in a substantially horizontal plane, compared to its position in the parked mode and is now extending towards the floating vessel 2 (not shown here). A transport boom 12 is connected to the main boom 11, and an object handler 13 is coupled to and movable along the transport boom 12 and is configured for handling battery packs 6 for transport between the storage area 4 and the target area 5.

In FIG. 9 the lifting mechanisms 61 have elevated the platform 60 to approximately the same height as the carousel 31 (not shown here) on the floating vessel 2. The mid doors 52 are open such that an empty slot for a battery pack is available for receiving a battery pack 6 transported by the object handler 13. An empty battery pack 6 from a floating vessel 2 may now be received in the mid slot of the platform 60 when the mid doors 52 are open.

Figure 10:
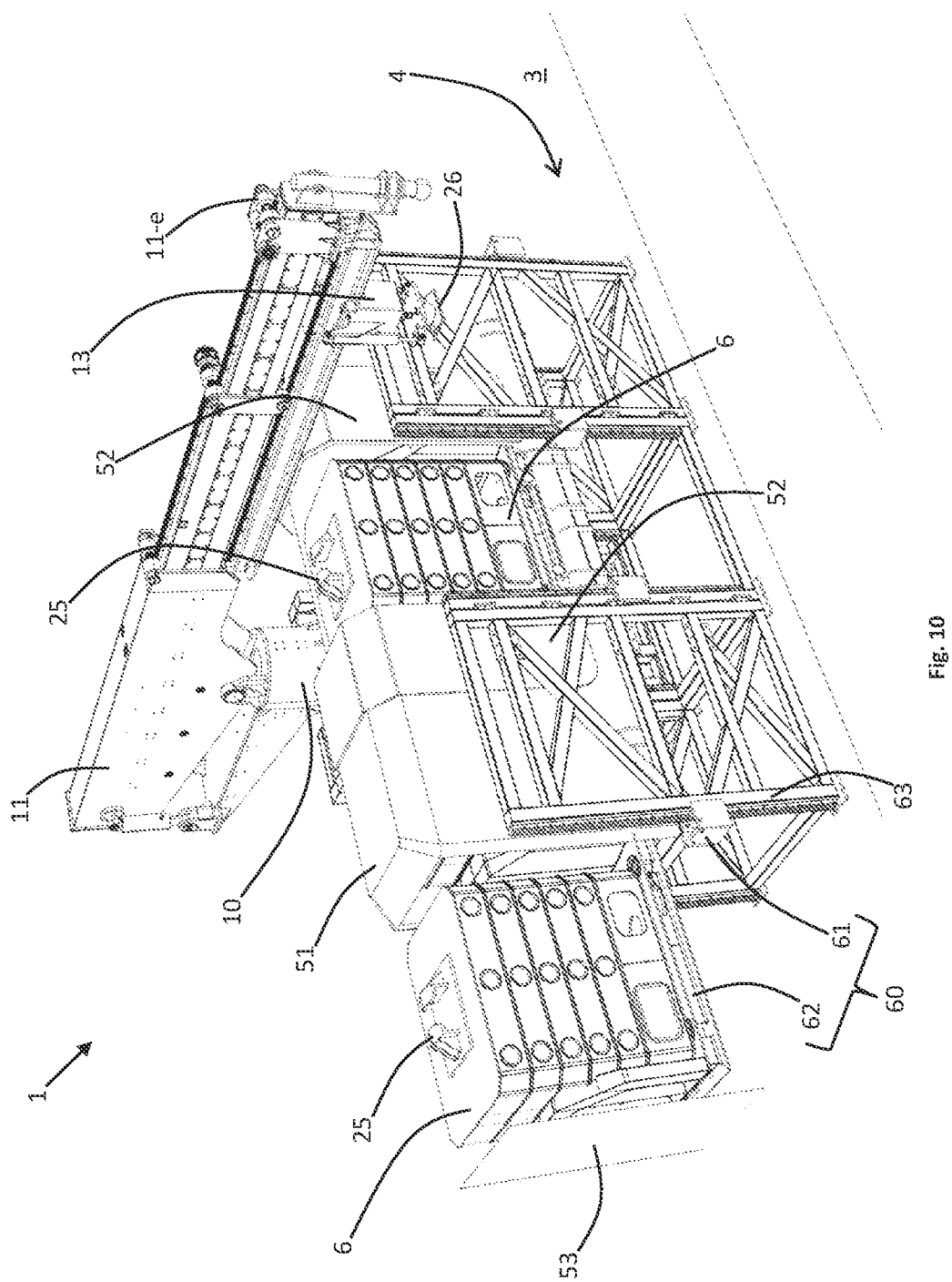
FIG. 10 shows the transport system of FIG. 7 in operation, wherein the platform has been moved orthogonally to the direction of the transport of the object.

The platform 60 further comprises a sliding plate 62, as illustrated in FIG. 10. The sliding plate 62 is slidable relative to the lifting mechanisms 61 and the housing 51 and is movable in a direction substantially orthogonal to the direction of the transport of the battery packs 6 between the shore 3 and the target area 5 on the floating vessel 2 (not shown here).

The housing 51 further comprises side doors 53. The side doors 53 on each end of the housing 51 are connected to the sliding plate 62 such that the side doors 53 are movable together with the sliding plate 62 and relative to the housing 51, as illustrated in FIG. 10. The sliding plate 62 may move a battery pack 6 to the opening between the mid doors 52 so that the battery pack 6 is positioned underneath the main boom 11 (see FIG. 10). The battery pack 6 is now available to be picked up by the transport handler 13. The object handler 13 is provided with a locking system 26 comprising a mechanical gripper for gripping the gripping interface 25 of the battery pack 6. The sliding plate 62 may move an empty slot on the platform 60 to the opening between the mid doors 52 so that the empty slot is positioned underneath the main boom 11. The empty slot may then be available for receiving a battery pack 6 transported by the object handler 13 along the transport boom 12.

Figure 11:
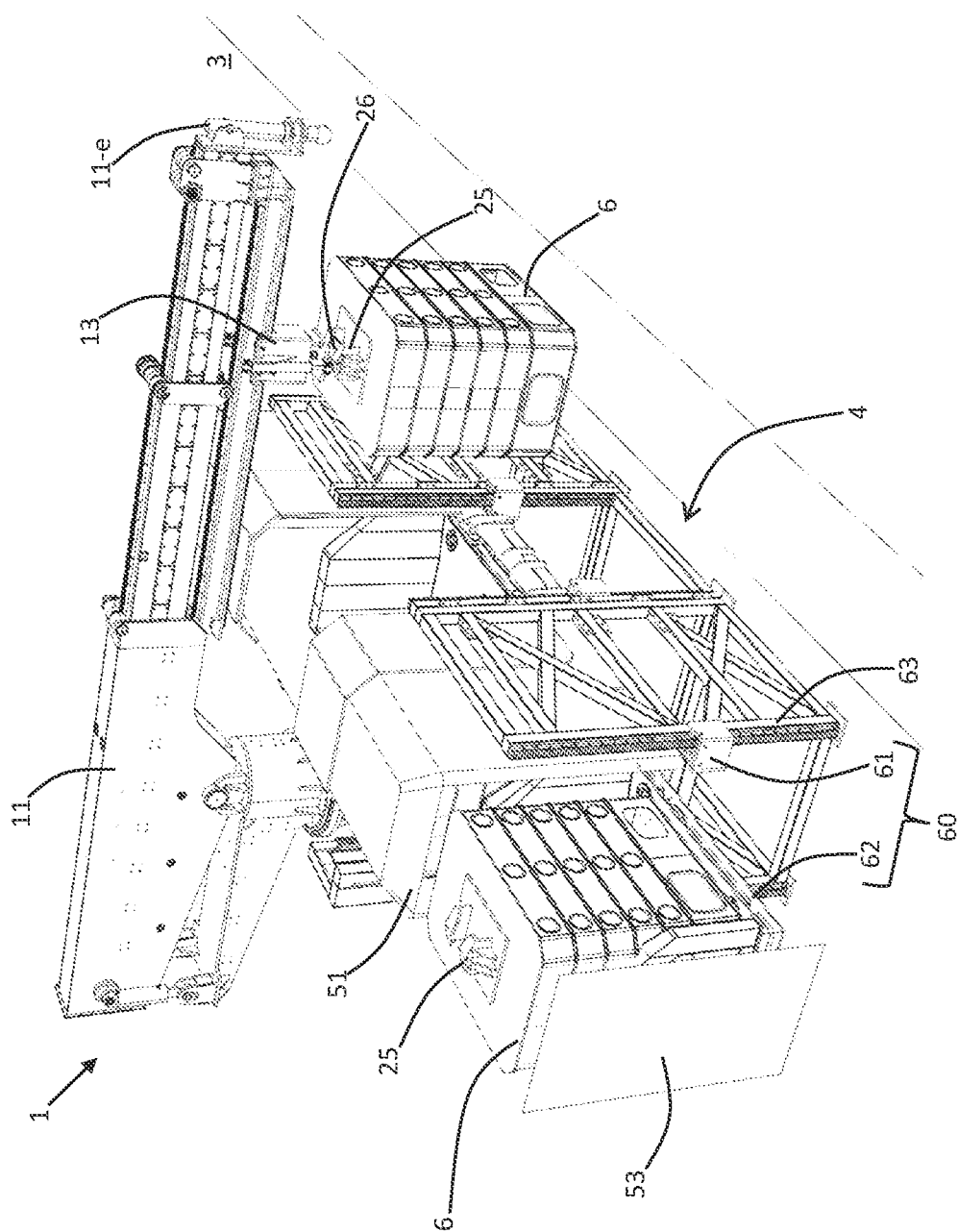
FIG. 11 shows the transport system of FIG. 7 in operation, wherein the object is transported by the object handler.

FIG. 11 shows a battery pack 6 transported by the object handler 13.

Swapping empty battery packs 6 from a floating vessel 2 with fully charged battery packs 6 stored on the platform 60 may occur as follows. When the floating vessel 2 has been moored to the shore 3 beside the storage area 4, the pedestal 10 and the platform 60 are elevated to an appropriate height, the main boom 11 extends towards the floating vessel 2 and the vertical support 14 forms a pivotably coupling with the support 32 on the target area 5 on the vessel 2. In this example, the carousel 31 on the floating vessel 2 stores two battery packs 6 to be swapped with two fully charged battery packs 6 from the storage area 4.

The sliding mid doors 52 are opened to reveal an empty slot for a battery pack 6 in the middle of the platform 60.

The object handler 13 is moved towards the carousel 31 on the floating vessel 2. When the object handler 13 is positioned above the first empty battery pack 6, the object handler 13 is lowered so that the locking system 26 grips the gripping interface 25 on the first empty battery pack 6. The object handler 13 is lifted upwards and is moved towards the platform 60 on the shore 3. The battery pack 6 may only be lifted a short distance to get enough clearance from the carousel 31 before being transported towards the platform 60. During the movement of the object handler 13 along the transport boom 12, telescopic joints of the main boom 11 and the pivotable couplings between the main boom 11 and the pedestal 10, and between the vertical support 14 and the support 32 switch between a locking mode and a free-float mode as described earlier.

When the object handler 13, carrying the first empty battery pack 6, has reached the empty slot in the middle of the platform 60, the object handler 13 is lowered so that the first empty battery pack 6 from the floating vessel 2 is placed in the empty slot.

The object handler 13 is now moved upwards from the platform 60 to have clearance from the platform 60. The sliding plate 62 is moved to the left so that a first fully charged battery pack 6, positioned at the far right of the platform 60, is positioned underneath the main boom 11 between the open mid doors 52.

The object handler 13 is lowered so that the locking system 26 grips the gripping interface 25 on the first fully charged battery pack 6. The object handler 13 is lifted upwards and is moved towards the carousel 31 on the floating vessel 2. The battery pack 6 may only be lifted a short distance to get enough clearance from the platform 60 before being transported towards the carousel 31.

When the object handler 13, carrying the first fully charged battery pack 6, has reached the empty slot on the carousel 31 (where the first empty battery pack 6 was previously stored), the object handler 13 is lowered so that the first fully charged battery pack 6 is placed in the empty slot on the carousel 31.

The object handler 13 is now moved upwards from the carousel 31 to have clearance from the carousel 31. The carousel 31 is rotated so that second empty battery pack 6 is positioned underneath the object handler 13.

The object handler 13 is lowered so that the locking system 26 grips the gripping interface 25 on the second empty battery pack 6. The object handler 13 is lifted upwards and is moved towards the platform 60 on the shore 3.

When the object handler 13, carrying the second empty battery pack 6, has reached the empty slot between the open mid doors 52 of the platform 60, the object handler 13 is lowered so that the second empty battery pack 6 from the floating vessel 2 is placed in the empty slot.

The object handler 13 is now moved upwards from the platform 60 to have clearance from the platform 60. The sliding plate 62 is moved to the right so that a second fully charged battery pack 6, positioned at the far left of the platform 60, is positioned underneath the main boom 11 between the open mid doors 52.

The object handler 13 is lowered so that the locking system 26 grips the gripping interface 25 on the second fully charged battery pack 6. The object handler 13 is lifted upwards and is moved towards the carousel 31 on the floating vessel 2.

When the object handler 13, carrying the second fully charged battery pack 6, has reached the empty slot on the carousel 31 (where the second empty battery pack 6 was previously stored), the object handler 13 is lowered so that the second fully charged battery pack 6 is placed in the empty slot on the carousel 31.

The two empty battery packs 6 on the carousel 31 on the floating vessel 2 have now been swapped with two fully charged battery packs 6 from the platform 6. The transport apparatus 1 may now return to its parked mode and the floating vessel 2 may sail away from the storage area 3.

In this example the carousel 31 on the floating vessel 2 stores two battery packs 6. However, more or less than two battery packs 6 may be stored on a carousel 31 on the floating vessel. Similarly, the platform 60 in this example stores two battery packs 6. More or less than two battery packs 6 may be stored on a platform 6 on the shore 3. The platform 60 in this example has one empty slot for receiving a battery pack 6. The platform 60 may have more than one empty slot for receiving a battery pack 6. In another example, the platform 60 may have no empty slots and the carousel 31 may have one or more empty slots for receiving a battery pack 6.

The particular embodiments disclosed above are illustrative only, as the invention may be modified and practiced in different but equivalent manners apparent to those skilled in the art having the benefit of the teachings herein. While the examples described herein are with respect to transporting battery packs 6 to and from a floating vessel 2, one of ordinary skill in the art will understand that the systems and devices described herein may be used to transport any type of objects 6 to and from two areas where both areas are located on land, or both areas are located on a same floating vessel or platform, or two floating vessels or platforms.

In the illustrative figures the storage area 4 is placed on shore 3 and the target area 5 on the floating vessel 2, but it could also be the opposite; the storage area 4 can be placed on the floating vessel 2 and the target area 5 on shore 3. The pedestal 10 can be placed on the storage area 4 or the target area 5, although it would be advantageous to have the pedestal 10 not placed on the floating vessel 2 to minimise the load on the vessel 2.

The transport apparatus and the pedestal 10 may be enclosed by a barrier or a fence.

In the embodiments shown in FIG. 1 to FIG. 6, the storage area 4 and the target area 5 each comprises a transport apparatus in the form of a rotatable carousels 30, 31. In other embodiments according to the invention, no such transport apparatuses may be used, or only one at one of the storage area 4 or the target area 5. The transport apparatuses can also have alternative configurations, such as a movable platform 60 illustrated in FIGS. 7-11, conveyor belts, vehicles, or platforms. In the case of the transport system 1 being used for transferring battery packs 6 between a floating vessel 2 and the shore 3, the transport apparatus on the shore 3 can facilitate the further transport of the battery packs 6 to a charging station for charging used batteries, or a charging station may be integrated with the transport apparatus on the shore 3. The transport apparatus 31 on the storage area 4 or the target area 5 on the floating vessel 2 can be configured for being in electrical connection with an electrical motor of the floating vessel 2. The transport apparatus may comprise mechanical guiding elements to facilitate the placement of the battery packs 6 on an empty slot on the transport apparatus.

Figure 13:
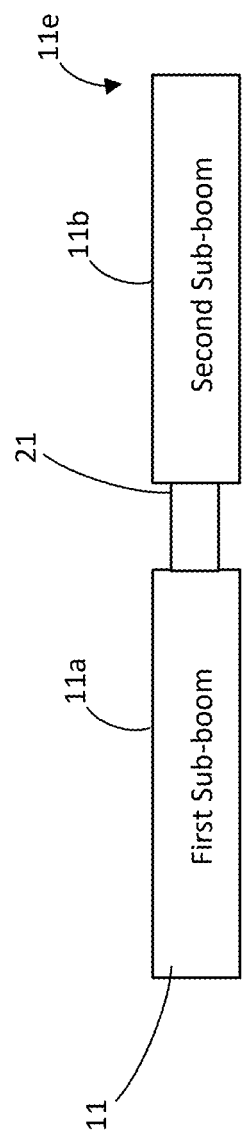
FIG. 13 shows a block diagram of a main boom comprising a first sub-boom and a second sub-boom pivotably connected to the first sub-boom for allowing the adjustment of the span of the main boom.

In the embodiments illustrated in FIG. 1 to FIG. 11, the main boom 11 comprises telescopic joints 20 for the dynamic adjustment of the span of the main boom 11. In other embodiments according to the invention, the main boom 11 can comprise a first sub-boom 11a and a second sub-boom 11b pivotably connected to the first sub-boom (via a pivotable connection 21) for allowing the adjustment of the span of the main boom 11 (see FIG. 13). The main boom 11 can be foldable, for instance in a vertical direction or a horizontal direction. The main boom that is foldable in the vertical direction may be a knuckle-boom.

In the illustrations described above, the objects 6 to be transported are presented as battery packs 6. A person skilled in the art will understand that the transport system 1 can be used to transport any type of objects 6, for example, but not limited to, heavy modules or hydrogen tanks. The function of the object handler 13 does not depend on a locking system 26 or a gripping interface 25 on the object 6. The object handler 13 can be a docking head, Remote Operated Vehicle (ROV), docking hook, docking bar, docking claw, docking mushroom, vacuum suction cup, vacuum head, docking mechanism, cargo actuator, movable trolley, a load actuator, a robot gripper, a robot arm, an automated hook, a magnetic head, and a latch mechanism.

Figure 12:
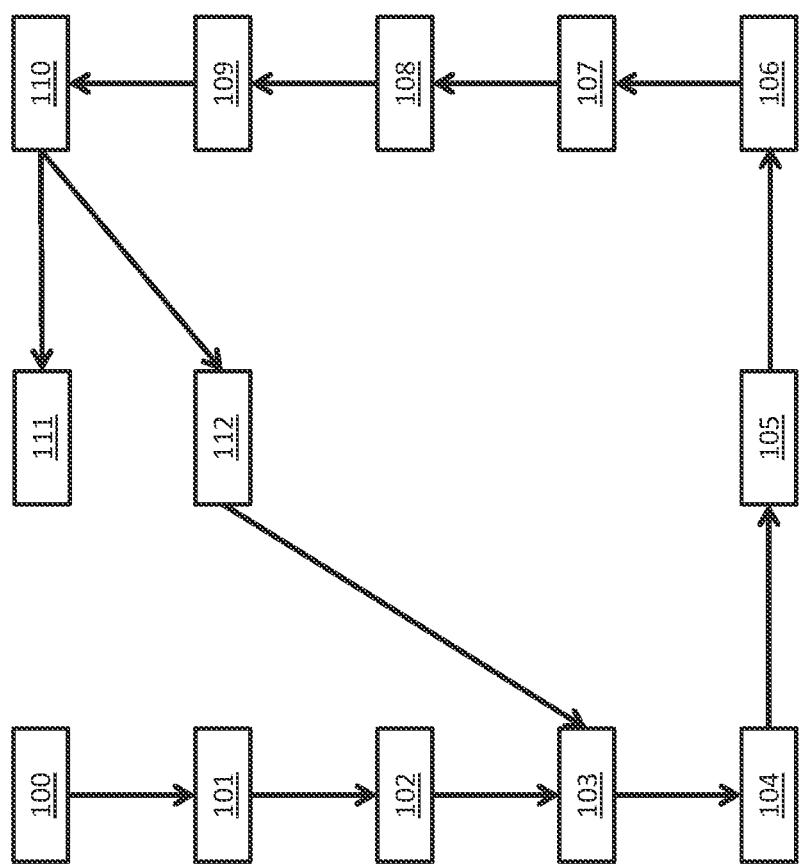
FIG. 12 shows a flow diagram of the automated transport system for swapping battery packs between shore and a floating vessel.

In an embodiment of the transport system 1 according to the invention, the transport system 1 further comprises a control system for controlling the transport system. It is possible to create a fully automated system using the control system. The transport system 1 can be used for swapping empty battery packs 6 on a floating vessel 2 with fully charged battery packs 6 on shore 3, using the embodiment of the transport system 1 illustrated in FIG. 1 to FIG. 11. The transport system 1 illustrated in FIGS. 1-5 may be operated using the control system following the steps according to the flow diagram in FIG. 12.

A first step 100 comprises a pre-arrival signal from the floating vessel 2 that activates the mechanical power system of the transport system 1, 5-10 minutes prior to the vessel's 2 arrival to the shore 3. Upon receiving the pre-arrival signal, the carousel 30 and the pedestal 10 on the storage area 4 on shore 3 will rise to the correct height based on the tidal water and loading condition of the floating vessel 2, so that the carousel 30 is at the same hight as the carousel 31 on the floating vessel 2. The main boom 11 rotates 90° in a substantially horizontal plane from the parked position towards the water.

A next step 101 comprises the control system receiving an automated signal from the floating vessel 2 when docked at the shore 3. This signal is confirmed by the vessel 2 bridge crew when the vessel 2 is securely moored alongside and in the correct position. The control system triggers the extension of the main boom 11 by extending the two telescopic joints 20, so that the vertical support 14 is located above the support 32 on the target area 5 on the floating vessel 2. The control system triggers the extension of the vertical support 14 into the support 32.

In step 102, a sensor signal from the vertical support 14 as it is supported by the support 32 will lead to engagement of the free-float mode of the inner telescopic actuator 22-1 and the tilt actuator 24, and to engagement of the locking mode of the outer telescopic actuator 22-2. The control system will then trigger the movement of the object handler 13 to the target area 5 above an empty battery pack 6 to be lifted off the vessel 2.

In a next step 103, sensors (not shown) on the object handler 13 or the battery pack 6 will confirm correct position to the control system, and the control system will trigger the object handler 13 to be lowered and lock onto the gripping interface 25 of the battery pack 6 using the locking system 26. The object handler 13 lifts the battery pack 6 off the carousel 31. The sensors for determining the correct position will be known from prior art and may comprise a camera, a proximity sensor, or a laser.

In a next step 104, the object handler 13 is moved along the transport boom 12. When the object handler 13 and the battery pack 6 suspended from it, is midway across the main boom 11, a signal will be sent to the control system which will switch the outer telescopic actuator 22-2 from a locking mode to a free-float mode, and the inner telescopic actuator 22-1 from a free-float mode to a locking mode. The orientation of the object handler 13 may be changed so that the battery pack 6 suspended from it will have a correct orientation for the placement on the carousel 30 on shore 2. The object handler 13 with the empty battery pack 6, is moved to a position above an empty slot on the carousel 30.

In a step 105 sensors on the object handler 13 or the battery pack 6 will confirm the correct position to the control system, and the control system will trigger the object handler 13 to be lowered and release the gripping interface 25 of the battery pack 6 to place it on the empty slot on the carousel 30.

In a next step 106, the object handler 13 is retracted to make a vertical clearance to the top of the empty battery pack 6. The control system then sends a signal to the carousel 30 to rotate in order to align a fully charged battery pack 6 with the object handler 13. In the embodiment wherein 3 battery packs 6 are placed on the carousel 30, the carousel 30 must turn 120 degrees.

In a further step 107, sensors on the object handler 13 or the battery packs 6 will confirm correct position to the control system, and the control system will trigger the object handler 13 to be lowered and lock onto the gripping interface 25 of the fully charged battery pack 6 using the locking system 26. The object handler 13 lifts the fully charged battery pack 6 off the carousel 30.

In a next step 108, the object handler 13 is moved along the transport boom 12. When the object handler 13 and the fully charged battery pack 6 suspended from it, is midway across the main boom 11, a signal will be sent to the control system which will switch the inner telescopic actuator 22-1 from a locking mode to a free-float mode, and the outer telescopic actuator 22-2 from a free-float mode to a locking mode. The object handler 13 with the fully charged battery pack 6, is moved to a position above the empty slot on the carousel 31.

A step 109 comprises sensors on the object handler 13 or the battery pack 6 that will confirm the correct position to the control system, and the control system will trigger the object handler 13 to be lowered and release the gripping interface 25 of the battery pack 6 to place it on the empty slot on the carousel 31.

In a next step 110, the object handler 13 is retracted to make a vertical clearance to the top of the fully charged battery pack 6.

One empty battery pack 6 has been swapped with a fully charged battery pack 6 and the operation can end, or the cycle can be repeated.

In a finishing step 111, the object handler 13 is moved towards the pedestal 10, the vertical support 14 is retracted, both sections 19 are retracted, the transport boom 12 is withdrawn inside a receiving part of the main boom 11, and the main boom 11 is rotated to a parked position as illustrated in FIG. 1.

For further transport of battery packs 6, the step 112 comprises the control system sending a signal to the carousel 31 to rotate in order to align the second empty battery pack 6 with the object handler 13. In the embodiment wherein 2 battery packs 6 are placed on the carousel 31, the carousel 31 must turn 180 degrees. The steps from 103 to 110 can be repeated until all the empty battery packs 6 have been switched with fully charged battery packs 6.

The person skilled in the art may easily find alternative solutions for the transport system. The invention covers all these variants as long as they are covered by the independent claim. No limitations are intended to the details of construction or design herein shown, other than as described in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements, and by means of a suitably programmed computer. In the device claims enumerating several means, several of these means may be embodied by the same item of hardware.

The invention claimed is:

1. A transport system for transporting an object back and forth between a storage area and a target area, the transport system comprising:
    a pedestal for being placed at one of the storage area and the target area,
    a main boom pivotably connected to the pedestal, wherein the main boom has a far end that is configured for being supported by the other one of the storage area and the target area while allowing for at least one rotational degree of freedom between the main boom and the other one of the storage area and the target area, wherein a span of the main boom is passively adjustable in length, wherein the main boom is either telescopic or foldable, at least during a first operational mode of the transport system,
    a transport boom being coupled with the main boom, the transport boom extending in a horizontal direction from the storage area to the target area, in operational use, wherein the transport boom is movably mounted to the main boom,
    a coupling between the transport boom and the main boom configured for actuating the transport boom for adapting a position of the transport boom relative to the main boom, and
    an object handler movable along or moved by the transport boom and being configured for handling the object to be transported between the storage area and the target area.

2. The transport system according to claim 1, wherein the far end of the main boom comprises a vertical support for resting on the other one of the storage area and the target area.

3. The transport system according to claim 1, wherein the main boom comprises a first sub-boom and a second sub-boom pivotably connected to the first sub-boom for allowing adjustment of the span of the main boom.

4. The transport system according to claim 1, wherein the main boom comprises at least one telescopic joint for allowing adjustment of the span of the main boom.

5. The transport system according to claim 1, further comprising an object handler actuator for manipulating a position of the object handler relative to the transport boom.

6. The transport system according to claim 1, wherein a length of the object handler is adjustable for facilitating picking up or releasing of the object.

7. The transport system according to claim 1, wherein the object handler is configured for gripping or releasing a gripping interface of the object.

8. The transport system according to claim 1, wherein the object handler is controllably rotatable for manipulating an orientation of the object when suspended from the object handler.

9. The transport system according to claim 1, further comprising a transport apparatus at the storage area for receiving the object and moving it within reach of the object handler or outside the reach of the object handler.

10. The transport system according to claim 1, further comprising a further transport apparatus at the target area for receiving the object and moving it within reach of the object handler or outside of reaching of the object handler.

11. The transport system according to claim 1, wherein the one of the storage area and the target area is placed on a floating vessel or floating platform.

12. The transport system according to claim 9, wherein the transport apparatus is adjustable in height to accommodate for tidal changes and/or loading condition of one of the storage area or the target area.

13. The transport system according claim 10, wherein the further transport apparatus is adjustable in height to accommodate for tidal changes and/or loading condition of one of the storage area or the target area.

14. The transport system according to claim 1, wherein the other one of the storage area and the target area comprises a support configured for receiving an end of the main boom or a vertical support of the main boom.

15. The transport system according to claim 10, wherein the transport apparatus is adjustable in height to accommodate for tidal changes and/or loading condition of one of the storage area or the target area.

16. The transport system according to claim 1, further comprising a second coupling between the transport boom and the main boom.

17. The transport system according to claim 4, wherein the main boom comprises at least two telescopic joints for allowing the adjustment of the span of the main boom.

18. The transport system according to claim 17, wherein the movement of each of the two telescopic joints is controlled by an actuator.

19. The transport system according to claim 18, wherein the actuator of each of the two telescopic joints has a locking mode, wherein said actuator is stiff for locking the position of its respective telescopic joint, and a free-float mode, wherein said actuator can freely extend or contract for allowing for the passive adjustment of the length of the span of the main boom.

20. A transport system for transporting an object back and forth between a storage area and a target area, the transport system comprising:
- a pedestal for being placed at one of the storage area and the target area,
- a main boom pivotably connected to the pedestal, wherein the main boom has a far end that is configured for being supported by the other one of the storage area and the target area while allowing for at least one rotational degree of freedom between the main boom and the other one of the storage area and the target area, wherein a span of the main boom is passively adjustable in length, wherein the main boom is telescopic, at least during a first operational mode of the transport system, and wherein the main boom comprises at least two telescopic joints for allowing adjustment of the span of the main boom,
- a transport boom being coupled with the main boom, the transport boom extending in a horizontal direction from the storage area to the target area, in operational use, and
- an object handler movable along or moved by the transport boom and being configured for handling the object to be transported between the storage area and the target area.

* * * * *